Nov. 28, 1933.                L. A. D. FILLIOL                1,936,785
                  ENGINE WITH ADJUSTABLE COMPRESSION CHAMBER
                      Filed June 11, 1930      3 Sheets-Sheet 1
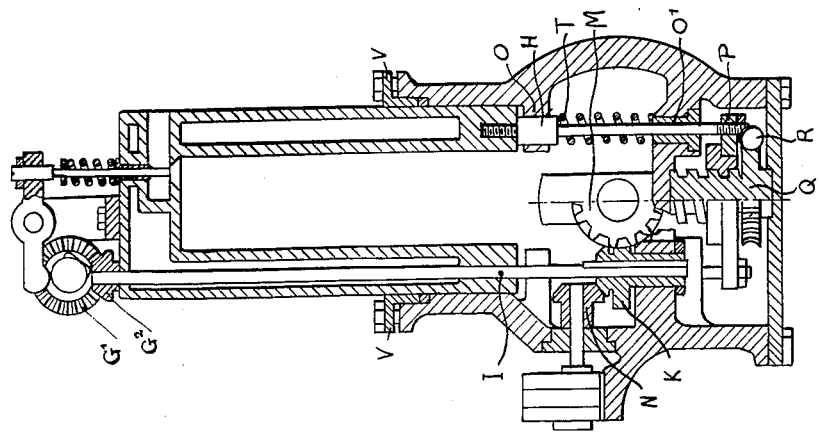
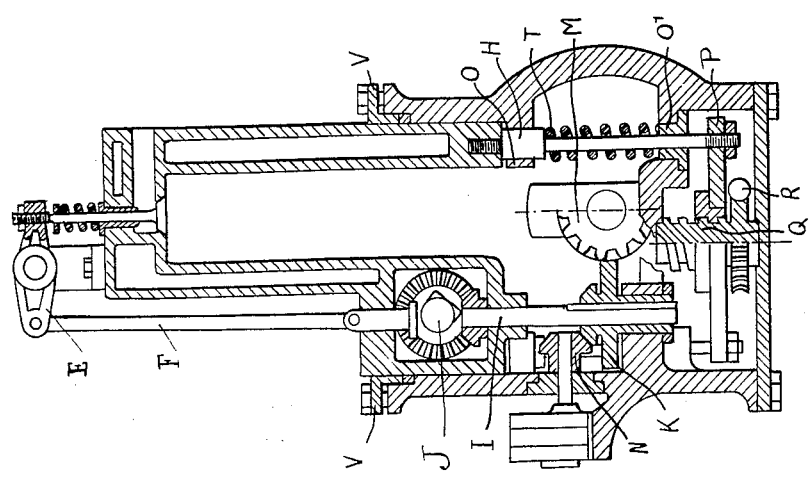
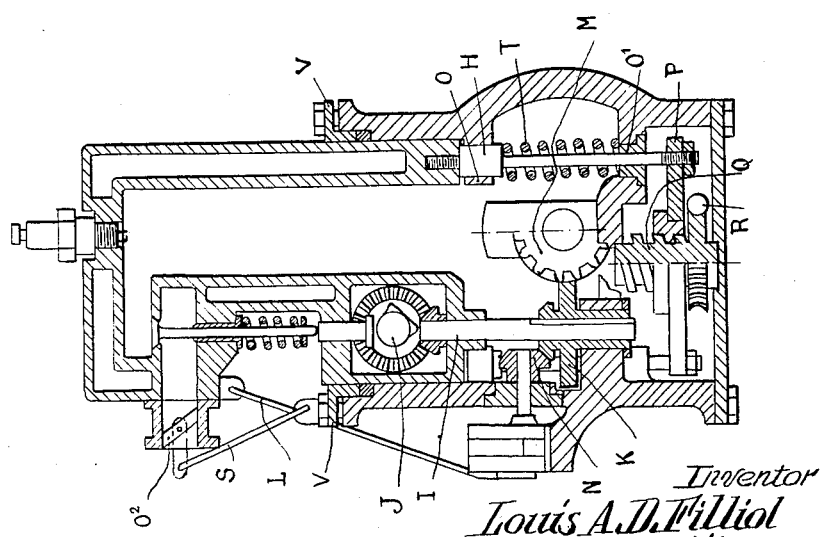
Inventor
Louis A. D. Filliol
By Marion & Marion
       Attorneys Nov. 28, 1933.                L. A. D. FILLIOL                1,936,785
              ENGINE WITH ADJUSTABLE COMPRESSION CHAMBER
                 Filed June 11, 1930        3 Sheets-Sheet 2

Inventor
Louis A. D. Filliol
By Marion & Marion
            Attorneys

Nov. 28, 1933.   L. A. D. FILLIOL   1,936,785
ENGINE WITH ADJUSTABLE COMPRESSION CHAMBER
Filed June 11, 1930     3 Sheets-Sheet 3
Fig. 7
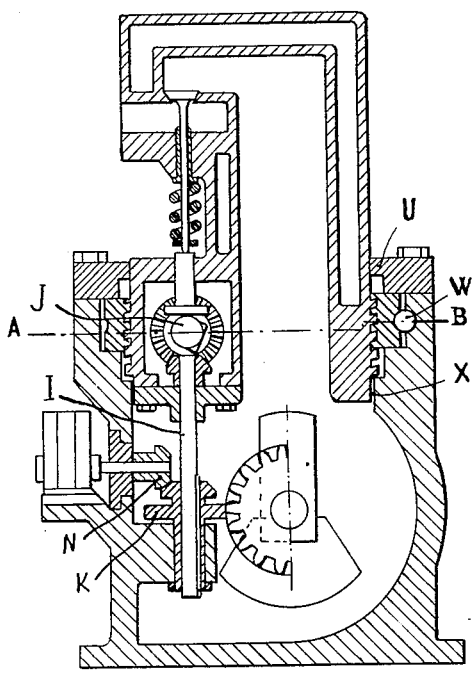
Fig. 9
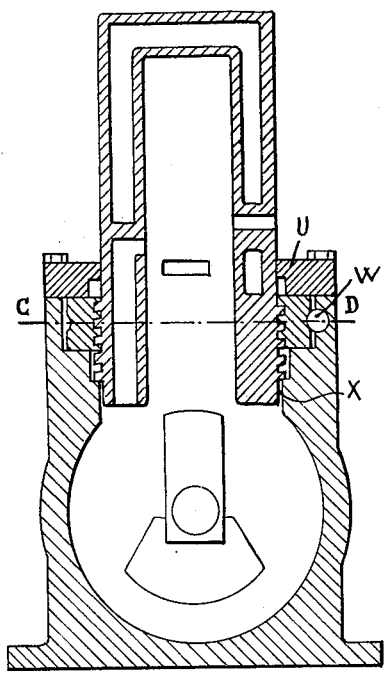
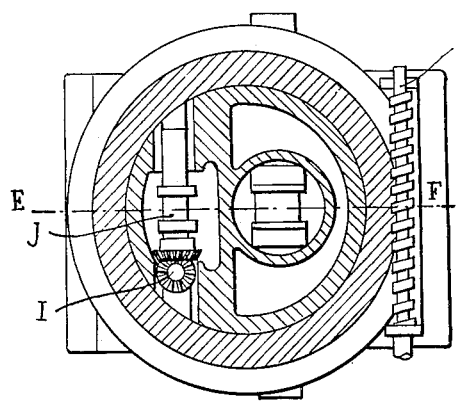
Fig. 6
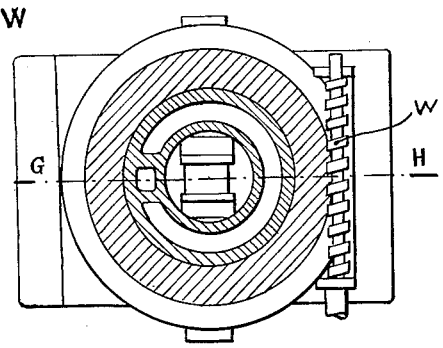
Fig. 8
Inventor
Louis A. D. Filliol
By Marion & Marion
Attorneys Patented Nov. 28, 1933

1,936,785

UNITED STATES PATENT OFFICE 1,936,785

ENGINE WITH ADJUSTABLE COMPRESSION CHAMBER

Louis Alain Daniel Filliol, Pantin, France

Application June 11, 1930, Serial No. 460,522, and in France July 13, 1929

2 Claims. (Cl. 123—48)

The present invention consists in obtaining in thermic engines a variable compression chamber or space by means of the cylinder block alternately sliding upwardly and inversely in the casing. The said operation can be performed during the time the engine is running, in allowing the required volume of the compression chamber to be obtained.

The purpose of this application consists in obtaining a constant ratio between the sucked gas and that of the compression chamber so as to give an engine with variable power, whose consumption per horse-hour will be constant for the various powers.

Considering an engine the cylinder of which contains one liter, having 6 as a ratio of compression, one will have at the end of the stroke a compression space of $1/6$ or a suction of one liter, the admission of gases being reduced in throttling the gases in the suction pipe for the case where the cylinder will have sucked about $2/3$ of one liter. In order to maintain the same ratio of compression, will have $2/3 \times 1/6 = 1/9$ of a liter; this being obtained in causing the cylinder to move down by the operation which will be hereinafter described. The piston stroke remaining always the same, the result is that in maintaining always the same ratio of compression, for the reduced volumes of cylinder, the expansion of the gases will be greater and the output slightly higher when the engine is running with full volume of cylinder.

Figs. 1, 2 and 3 show sections of engines with four cylinders which only differ the one from the other but as regards their intake, the sliding principle of the cylinder block being the same for the three engines. (For the sake of clearness of the drawings), the balls and pistons have not been represented the sections being made according to AB and CD of Fig. 4.

Fig. 1 shows the section of an engine of the type in which the cylinder head is L-shaped and in which the intake takes place sidewise.

In Fig. 2, the intake takes place at the top by means of a rocker E controlled by the lever F.

In Fig. 3, the intake takes place at the top by means of the cam shaft driven by bevel gears G1—G2.

Figure 5:
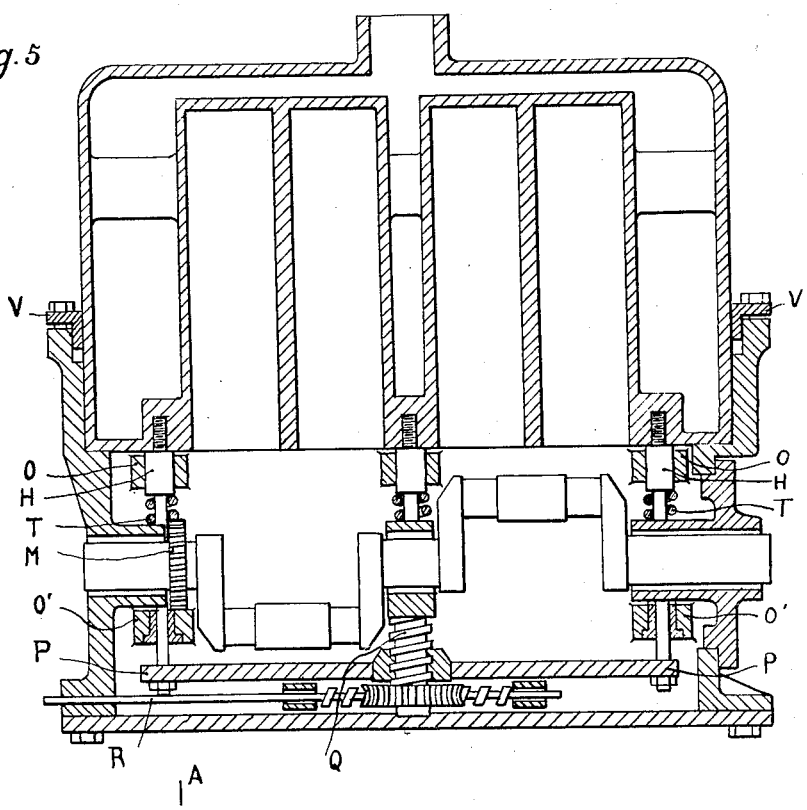
Figure 4:
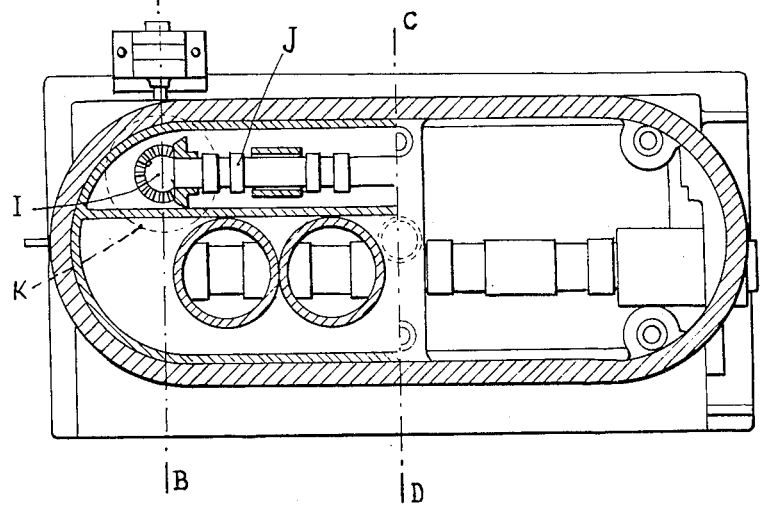

Figs. 4 and 5 show in plan and in elevation a four-cylinder engine of Figs. 1 to 3.

For the purpose of maintaining the same adjustments to the various positions of the cylinders, the intake device is connected to the cylinders and follows all the movements of the latter. The drive of the cam-shaft can be obtained through various means. In Fig. 1, the drive of the cam-shaft J is secured by the shaft I the keys of which slide in the helical piston K receiving its motion from the helical gear wheel M keyed to the power shaft.

The helical gear wheel K carries at the top a bevel gear which drives the gear wheel of the magneto N. The cylinder-block is fastened by the standards or columns H screwed into the block sliding in the gauged parts O, O1 of the gear case and connected to the lower part by the plate P, springs T press upon the cylinder-block so as to avoid vibrations and the control of the plate P is secured by the screw with square threads Q controlled on its turn by the endless screw R.

The adjustment or governing of the early or advanced ignition is obtained by means of the lever L secured to the cylinder-block so as to reduce the advance when the cylinders move down (reduced compression chamber or space) and to increase the same in the reverse case.

Besides the governing of the gases by means of the carburettor, the governing of the admission gases is obtained by means of a throttle valve O2 controlled by the lever S secured to the gear case so as to reduce the admission when the cylinder moves down (reduced compression space) and to increase the same in the reverse case.

*Governing.*—The governing of the throttle valve will take place when the carburettor is fully open so as to limit the admission of the gases in order to prevent shocks in the cylinder (case of automatic ignition caused by a too high ratio between the volume of the compression chamber and the sucked gas; in such a case, the early or advanced ignition which must be at a minimum is to be verified, as the shocks can be due to too high an advance).

The stuffing box V at the upper part of the gear case prevents every leakage of oil.

Figs. 6 and 7 show the sections of a four stroke one-cylinder engine; the sections are made respectively according to lines A', B' and E, F.

Figs. 8 and 9 show the sections of the two-stroke one cylinder-engine; the sections are made respectively according to line C', D' and G, H.

As in said engines, the available room is limited in the gear case, the controlling parts of the cylinder-block are disposed outside the gear case; the said control is obtained by means of a square thread made on the cylinder and a nut actuated by the endless screw W secures the rise and the descent of the cylinder. The cylinder and its nut are embedded in the gear case and are held by the part U. The cylinder is keyed to the base and can slide in the grooves X of the gear case; the arrangement for governing the gases and the early or advanced ignition is the same as in Fig. 1.

The arrangement for the delivery in the four-stroke engine is exactly the same as the one described with reference to Fig. 1.

The invention can be used in connection with internal combustion engines, the forms and sizes of the means for carrying out the external and internal operations of the cylinder-blocks can vary without departing from the principle of the invention.

What I claim is:

1. In a variable compression chamber explosion motor having the usual cylinder block and a separate crank-case, puller rods secured to the lower internal part of the cylinder block, a central plate at the lower inside part of the crank-case to which said rods are attached, and a central screw for moving and limiting the movement of the cylinder block, both ways, relative to the crank-case.

2. In a variable compression chamber explosion motor having a movable cylinder block, a crank-case and intake system, puller rods secured to the lower internal portion of the block, a central plate at the inside lower part of the crank-case to which the puller rods are secured, a central screw for moving and limiting the movement of the block both ways, and a vertical driving shaft sliding in gears on the crank-case, whereby the intake system is integral with the block during its movements.

LOUIS ALAIN DANIEL FILLIOL.